April 29, 1952 H. B. LARZELERE 2,595,086
SURGICAL INSTRUMENT
Filed Nov. 30, 1948
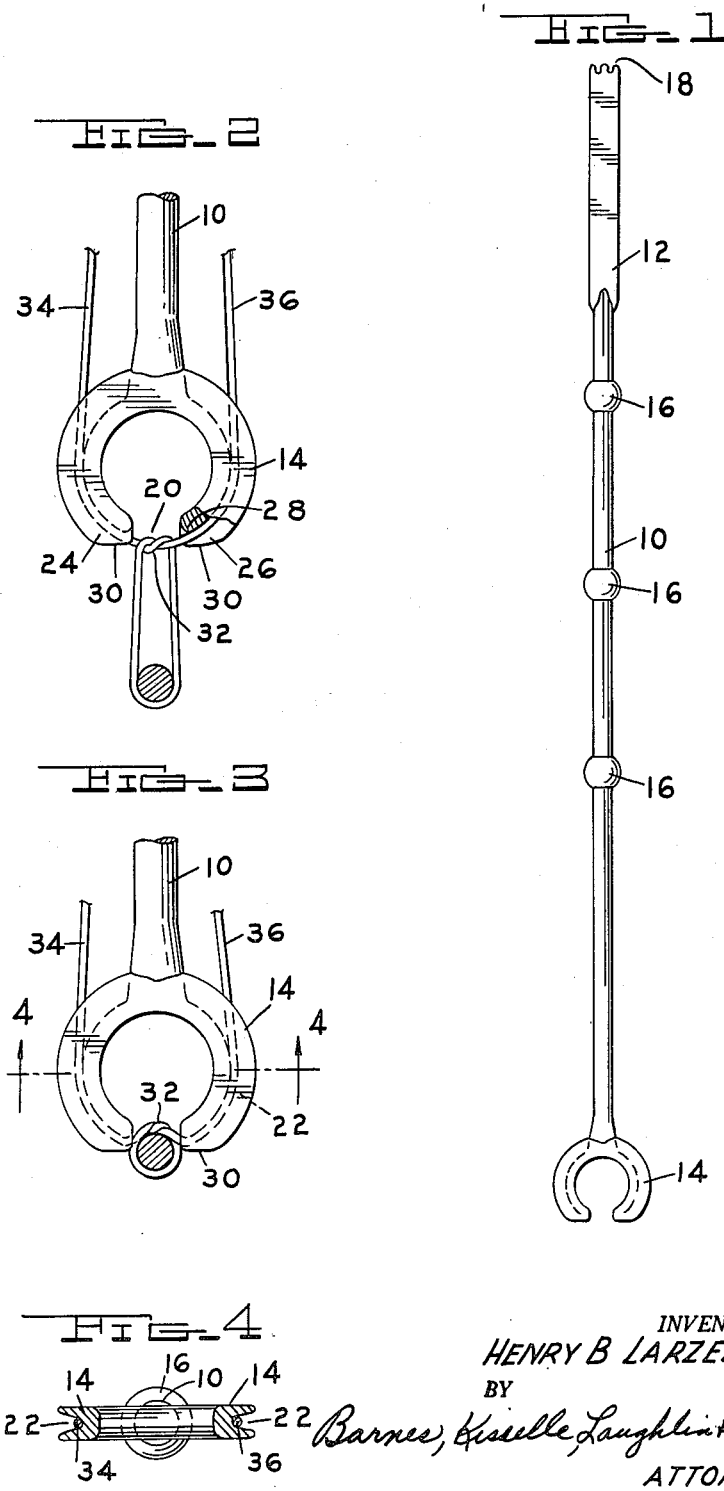
INVENTOR.
HENRY B LARZELERE
BY
Barnes, Kisselle, Laughlin & Raisch
ATTORNEYS Patented Apr. 29, 1952

2,595,086

UNITED STATES PATENT OFFICE 2,595,086

SURGICAL INSTRUMENT

Henry B. Larzelere, Flint, Mich.

Application November 30, 1948, Serial No. 62,684

6 Claims. (Cl. 128—326)

1

This invention relates to a surgical instrument and more particularly to a device for tying ligatures in deep wounds and difficult exposures.

In tying ligatures in wounds where the surgeon's finger tips have ready access to the depth of the wound, little difficulty is experienced since the surgeon can manipulate the ligature with his fingers at the point of tying. However, in situations where the exposure is of considerable depth and where the placement and the tying of the knot by the fingers is difficult, or at best done by using a long hemostat or long thumb forceps as a sort of "third finger," the operation of tying the knot is difficult to say the least.

It is an object of this invention to provide a simply constructed instrument which can be utilized for tying ligatures on blood vessels or other bleeding points which greatly simplifies and eases the ligation procedure.

It is a further object of the invention to provide a ligature typing instrument which is especially adapted for tying ligatures in deep wounds where the blood vessel or other bleeding point is inaccessible by the surgeon's fingers.

Another object of the invention is to provide a ligature typing instrument which is constructed such that it provides clearance for the ligature knot and offers no visual obstruction at the point of tying and therefore eliminates the objectionable feature of "blind tying" which is associated with other instruments with which I am familiar.

In the drawings:

Figure 1 is an elevational view of the instrument of this invention.

Figure 2 is a fragmentary view on an enlarged scale and partly in section of one end of the instrument showing the ligature arrangement at the start of the tying operation Figure 3 is a view similar to Figure 2 showing the arrangement of the instrument and the ligature after the knot has been securely tied.

Figure 4 is a sectional view taken along the lines 4—4 of Figure 3.

Referring now to the drawings and particularly to Figure 1, the instrument comprises a slender handle portion 10 having at one end thereof a flattened blade portion 12 and at the other end a ring member 14. Along the handle 10 which is preferably in the form of a small diameter shaft there is spaced a plurality of spherical obstructions 16 which serve as means for preventing the handle 10 from slipping between the operator's fingers as it is pushed into a deep wound. The flattened blade portion 12 is provided with serrations 18 at its free end which

2 are of sufficient depth to engage a ligature loop and carry it as the instrument is guided by the surgeon to the blood vessel or other bleeding point which is to be tied.

As is shown more clearly in Figures 2 and 3, ring member 14 at the other end of the instrument is utilized for slipping a ligature knot down to a point of tying after the ligature loop has been guided or pushed down to the tying point by the ligature carrier portion 12. The endmost portion is slotted radially so as to provide a clearance gap 20 at the end of the instrument in which the knot portion of the ligature is disposed in the tying operation. Gap 20 is preferably about $\tfrac{3}{16}''$ wide. The ring member 14 is provided with a peripheral groove or recess 22 having a depth preferably greater than the thickness of the ligature. At the end portions 24 and 26 of ring 14 the groove 22 is fashioned so as to provide upwardly directed round corners 28 which aid in the slipping action of the ligature and serve to enable the tying of a tight knot. The lower edges of the end portions 24 and 26 are cut away so as to provide a substantially flat surface 30 which decreases the depth of the grooves 22 at this point and provides clearance at the lower end of the instrument.

In using the instrument, the surgeon first engages the ligature in the serrations 18 of the carrier portion 12 and manipulates the handle 10 so as to place the ligature down beyond the tip of a hemostat holding the tie point and around the tie point. The ligature is then tied into a loose knot 32 and the ring member 14 is utilized for slipping or pushing the knot down to the blood vessel or other point of tying. This is accomplished by holding the free ends 34 and 36 of the ligature with the fingers of one hand and manipulating the handle 10 with the other hand so as to engage the free ends of the ligature in the grooves 22 of the ring member 14. This operation can be easily accomplished by engaging one of the ligature ends, end 34 for instance, in one of the grooves 22 and then shifting the ring member 14 laterally to the left so that the other groove can be aligned and engaged with the other ligature end 36. With the ends 34 and 36 engaged in grooves 22 and held with one hand, the operator simply pushes the handle 10 downwardly with his other hand and the knot is thereby pushed or slipped down around the blood vessel being tied. This slipping movement is aided by the fact that at the end portions 24 and 26 the grooves 22 are disposed somewhat transversely of the axis of the handle 10 so that the ligature ends 34 and 36 are guided and slip in grooves 22 in the direction one would normally pull these end portions for tightening the knot. The final tightening of the knot is accomplished by pushing the ring member downwardly so that the groove 22 is disposed below the actual point of tying. This provides the added tension required for obtaining a tight knot. The rounded corners 28 of the grooves 22 facilitate the slipping movement of the ligature in the final stages of tying. The operation can be repeated for tying a second or third knot.

By utilizing an instrument of this type, it will be observed that a ligature may be tied easily an unusually deep wound without any danger of injuring the surrounding tissue and without any visual obstruction to the tying operation. This is true because the end portions 24 and 26 of the ring 14 are flattened at their lower ends and are spaced apart sufficiently to permit the knot and the blood vessel to be disposed between these end portions. In addition, it will be observed that by providing a knot tier in the form of a ring or a similarly shaped member, additional clearance is provided between the knot and the end of the handle portion of the instrument.

The spaced obstructions 16 on the handle 10 offer opposition to the surgeon's fingers as the handle is being pushed into the wound against the knot. This prevents slipping of the handle between the surgeon's fingers and at the same time provides means for gripping the handle at differently spaced distances from each end of the instrument for working in wounds of different depths.

It will thus be seen that I have provided a very simply constructed instrument which greatly facilitates the tying of ligatures in deep wounds or difficult exposures. By providing the open grooves 22, the instrument may be engaged with the ligature ends with little difficulty; and by shaping the portions 24 and 26 of the ring 14 as shown, the ligature ends are pulled in a direction which permits easy slipping of the knot down to the point of tying and results in a tightly tied knot. The instrument it will be noted is of simple construction which offers no difficulty in sterilization and the provision of open grooves rather than eyelets through which the ligature must be threaded greatly simplifies the ligation procedure.

I claim:

1. A surgical instrument for tying ligatures comprising a shaft member shaped to provide handle means for the instrument and a ring member connected at a portion of its periphery to one end of said shaft member, said ring member being slotted radially at a portion thereof so as to provide a pair of spaced opposing end portions and having a groove around its outer periphery extending to the ends of said opposing end portions, said groove lying wholly within a substantially flat plane, said ring member having a periphery of gradual curvature and being fashioned such that each end portion of said ring adjacent said slotted portion and the portion of the groove therein extend in a direction generally perpendicularly of shaft member, whereby when a length of ligature is looped around a bleeding point and tied into a loose knot with the free ends of said ligature engaged in the grooved periphery of said ring member and extended axially of said shaft member and with the knot disposed between said end portions of said ring, said shaft member may be pushed in the direction of said bleeding point so as to slip said knot down to said bleeding point and tighten it.

2. A surgical instrument for tying ligatures comprising a slender shaft having axially spaced obstructions thereon for preventing lengthwise slipping of the shaft when gripped between the operator's fingers and a ring member secured to one end of said shaft, said ring member being slotted at a portion thereof to provide a pair of arcuate fingers extending from the end of said shaft with the free ends of the fingers spaced apart and extending towards each other along a line substantially perpendicular to said shaft, said ring member being grooved around its outer periphery, said groove adjacent the free ends of said fingers extending generally in a direction perpendicular to the axis of said shaft.

3. A surgical instrument for tying ligatures comprising a slender handle portion and a pair of fingers projecting outwardly beyond said handle portion at one end thereof, said fingers being arranged such that their free ends are spaced apart to provide a gap therebetween greater in size than a ligature knot, said fingers each being provided around the outer edge thereof with a groove extending from the free end thereof towards said handle portion, at the free ends of said fingers said grooves extending inwardly towards each other in a direction inclined towards said handle portion and at a point on said fingers spaced slightly from the ends thereof, said grooves extending in a direction generally transversely of the axis of said handle portion and being of less depth at the free ends of said fingers than around a portion of said fingers spaced from the free ends thereof.

4. A surgical instrument for tying ligatures comprising a slender handle portion having a pair of arcuate fingers projecting outwardly beyond said handle portion at one end thereof, said fingers being fashioned such that their free ends are spaced apart to provide a gap therebetween of a size only slightly larger than necessary to accommodate a blood vessel between said free ends, said fingers each being provided around the outer edge thereof with a groove extending from the free end thereof toward said handle portion, said fingers each assuming the shape of a gradual curve and being fashioned such that with a ligature disposed in said grooves and spanning said gap the curvature at the free end portions of the fingers is generally tangential to the portion of the ligature spanning said gap.

5. A surgical instrument for tying ligatures comprising a slender handle portion having a pair of arcuate fingers projecting outwardly beyond said handle portion at one end thereof, said fingers extending in a converging relation towards the free ends thereof and being spaced apart at their free ends to provide a gap therebetween of a size only slightly larger than necessary to accommodate a blood vessel between said free ends, said fingers each being provided with a groove extending from the free end thereof toward said handle portion, said grooves adjacent the free end portions of said fingers cooperating to generally define an arc of a circle which is interrupted by said gap.

6. A surgical instrument for tying ligatures comprising a shaft member shaped to provide handle means for the instrument and a ring member connected at a portion of its periphery to one end of said shaft member, said ring member being slotted radially at a portion thereof so as to provide a pair of spaced opposing end portions and having a groove around its outer periphery extending to the ends of said opposing end portions, said groove lying wholly within a substantially flat plane, said slotted portion being arranged such that the groove in each end portion of said ring adjacent said slotted portion extends in a direction generally transversely of said shaft member, whereby when a length of ligature is looped around a bleeding point and tied into a loose knot with the free ends of said ligature engaged in the grooved periphery of said ring member and extended axially of said shaft member and with the knot disposed between said end portions of said ring, said shaft member may be pushed in the direction of said bleeding point so as to slip said knot down to said bleeding point and tighten it, and including one or more obstructions projecting from and spaced axially along the surface of said handle so as to prevent said handle from slipping between the fingers of the operator when said handle is pushed downwardly against said ligature knot to slip the knot down to the bleeding point.

HENRY B. LARZELERE.

REFERENCES CITED

The following references are of record in the file of this patent:

UNITED STATES PATENTS

| Number | Name | Date |
|---|---|---|
| 553,610 | Falkenstein | Jan. 28, 1896 |
| 1,618,351 | Raycraft | Feb. 22, 1927 |
| 1,990,404 | Doner | Feb. 5, 1935 |
| 2,131,321 | Hart | Sept. 27, 1938 |

FOREIGN PATENTS

| Number | Country | Date |
|---|---|---|
| 70,517 | Switzerland | Oct. 1, 1915 |
| 479,719 | Great Britain | Feb. 10, 1938 |